Sept. 9, 1969    R. C. ACKER ET AL    3,466,065

RUPTURABLE DIAPHRAGM COUPLING

Filed April 4, 1968

INVENTORS
RICHARD C. ACKER,
EUGENE BAHNIUK,
& ROBERT E. KOZULLA
BY
M<sup>c</sup>NENNY, FARRINGTON, PEARNE, & GORDON

ATTORNEYS

United States Patent Office 3,466,065
Patented Sept. 9, 1969

3,466,065
RUPTURABLE DIAPHRAGM COUPLING
Richard C. Acker, Chagrin Falls, Eugene Bahniuk, Gates Mills, and Robert E. Kozulla, Willowick, Ohio, assignors to The Weatherhead Company, Cleveland, Ohio, a corporation of Ohio
Filed Apr. 4, 1968, Ser. No. 718,717
Int. Cl. F16l 35/00, 37/00
U.S. Cl. 285—3
8 Claims

ABSTRACT OF THE DISCLOSURE

A coupling is disclosed which includes two coupling halves each provided with a diaphragm normally sealing the coupling. A cutter is provided in one coupling half and is arranged to cut both diaphragms as the coupling halves are assembled. The diaphragm assembly of one coupling half includes a rigid tube frangibly connected to its coupling half and provided with a thin dome-shaped diaphragm extending thereacross. During assembly the frangible connection between the tube and the coupling half is broken and subsequently the cutter cuts both diaphragms. The cutter is arranged with a central point and symmetrical cutting edges which cut the diaphragms into leaves which are pressed back clear of the bore by a tubular portion of the cutter.

BACKGROUND OF INVENTION

The present invention relates generally to tube couplings and more particularly to couplings for closed fluid pressure systems adapted to effect communication between the systems only after the coupling members are connected together in sealing relationship with respect to the atmosphere.

Various types of couplings have been arranged to provide a diaphragm in each coupling half to close the half until the coupling halves are connected together. Such prior couplings are often provided with cutters which cut the diaphragms only after a sealed connection is provided between the coupling halves. An example of one such coupling is disclosed in the United States Letters Patent to Kozulla, 3,285,627, dated Nov. 15, 1966. This patent is assigned to the assignee of the present invention.

SUMMARY OF INVENTION

Although various prior art coupling arrangements functionally operate to provide the fluid connection between the coupling halves, only after the coupling halves are assembled together, many of the prior art structures have certain disadvantages. For example, some of the prior art structures provide some flow restriction after the two coupling halves are connected. Other structures result in a relatively expensive coupling.

The coupling structure incorporating the present invention provides a substantially unrestricted flow connection through the coupling after the coupling halves are assembled. The structure of the coupling is relatively simple and is adapted to low-cost manufacturing procedures. Therefore, a coupling according to this invention provides improved flow characteristics with a low-cost assembly.

In the illustrated embodiment of this invention, one of the diaphragms in one of the coupling halves is formed of a relatively rigid tube having a dome-shaped diaphragm extending thereacross. The thickness of the diaphragm is substantially less than the thickness of the tube. The diaphragm in the illustrated embodiment is soldered into the tube around its periphery. The tube is mounted on the associated coupling half by a solder joint which is sheared by the assembly of the coupling half with the mating coupling half. Prior to assembly the coupling relies only upon static seals to close the coupling halves. During assembly the soldered joint between the diaphragm tube and the coupling half is sheared permitting relative axial movement between the diaphragm assembly and the associated coupling half.

The cutter is provided which is formed of a tube member having a cutter projecting from one end thereof. The cutter includes four cutting edges symmetrically extending inward and forwardly to a sharp point at the center of the coupling. The cutter is arranged to cut the diaphragm into four leaves as it is pressed through the diaphragm. Assembly of the coupling is not completed until the tube portion of the cutter extends along the cut leaves and presses them back closely against the wall of the tube. With this arrangement the openings through the coupling, after the two coupling halves are assembled, is substantially unrestricted and provides a cross-sectional area for flow substantially equal to the area of the tubes joined by the coupling halves.

OBJECTS OF INVENTION

It is an important object of this invention to provide a novel and improved coupling structure including a diaphragm assembly closing at least one coupling half and arranged to be cut by a cutter during the assembly of the two coupling halves.

It is another important object of this invention to provide a novel and improved coupling wherein the coupling assembly includes a relatively rigid tube frangibly connected to the associated coupling half and provided with a thin diaphragm web extending thereacross, the web being the portion cut during the assembly of the coupling.

It is another object of this invention to provide a novel and improved coupling according to either of the preceding objects wherein the cutter is arranged to press back the diaphragm parts so that a substantially unrestricted flow connection is provided through the coupling after assembly.

Further objects and advantages will appear from the following description and drawings wherein.

Figure 1:
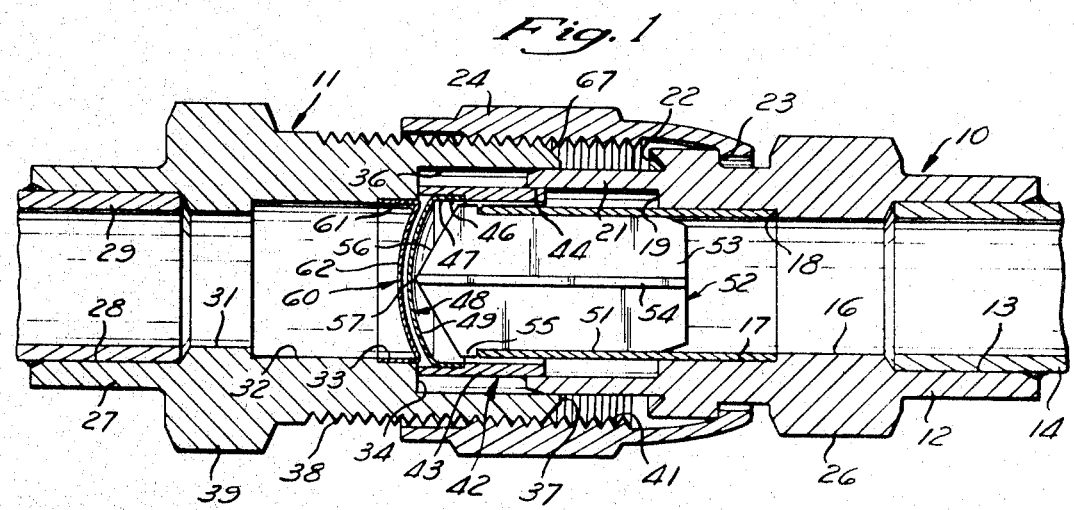
FIGURE 1 is a side elevation in longitudinal section of a coupling incorporating this invention illustrating the coupling halves in an initial phase of assembly before the cutter cuts through the diaphragms.

In the illustrated embodiment of this invention the coupling includes a first coupling half 10 and a second coupling half 11. The first coupling half 10 includes a body 12 formed with a bore 13 extending forward from its rearward end proportioned to receive the end of a connecting tube 14. The tube may be welded, brazed, or otherwise connected to the body 12. Extending forward of the bore 13 the body 12 is formed with a second bore 16 having a diameter substantially equal to the inside diameter of the tube 14. The second bore 16 extends forward to a third bore 17 joined to the second bore 16 by a radial shoulder 18. The third bore 17 extends forward to a second shoulder 19 which extends radially to a tubular projection 21 extending axially forward from the shoulder 19. The outer surface of the tubular projection 21 joins with a conical wall 22 substantially in radial alignment with the shoulder 19. Rearwardly of the conical wall 22 the body 12 is formed with a radial wall 23 which provides a shoulder for the rearward end of a tube nut 24. Rearwardly of the shoulder 23 the body 12 is also formed of a wrenching portion 26 which is preferably hexagonal in shape.

The coupling half 11 is provided with a body 27 again formed with a forwardly extending first bore 28 proportioned to receive the end of a tube 29. Here again the tube may be welded, brazed, or otherwise suitably connected to the body 27. Forwardly of the bore 28 the body 27 is formed with a second bore 31 having a diameter substantially equal to the inside diameter of the tube 29 and also equal to the diameter of the bore 16 in the body 12. Extending forwardly from the second bore 31 is a third bore 32 having a diameter greater than the diameter of the bore 17 in the body 12.

A counterbore 33 extends forwardly from the bore 32 to a radial wall 34 which joins the counterbore 33 with a second counterbore 36. The second counterbore 36 extends along the body to the forward end 37 thereof. The outer surface of the body 27 is formed with external threads 38 extending back to a location substantially adjacent to a hexagonal wrenching portion 39.

Figure 2:
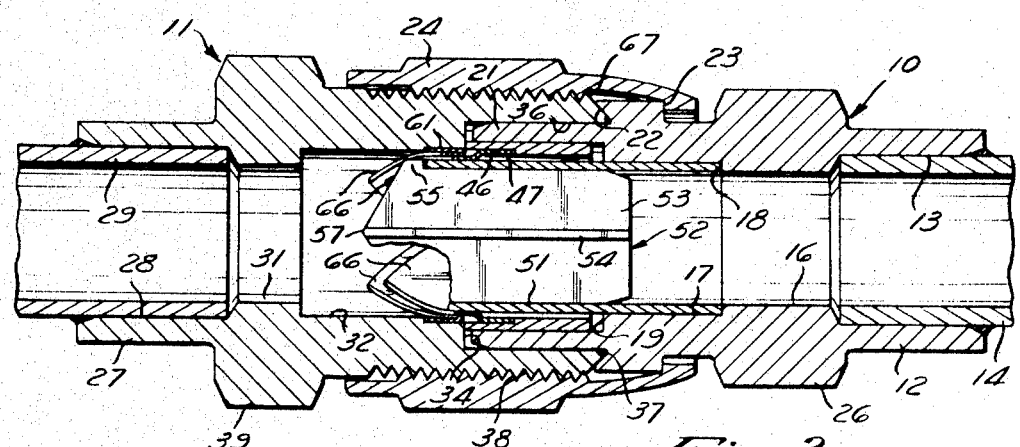
FIGURE 2 is a longitudinal section similar to FIGURE 1 illustrating the coupling halves in the final coupled position; and, FIGURE 3 is a fragmentary perspective view illustrating the cutter projecting through the diaphragm at the completion of the assembly of the two coupling halves.

The tube nut 24 is internally threaded at 41 so that it may be threaded onto the body 27 to press the two coupling halves toward each other to the final coupled position illustrated in FIGURE 2. As the coupling is assembled the external surface of the tubular projection 21 fits into the counterbore 36 with an interference fit and forms a metal-to-metal seal between the two coupling halves as disclosed and claimed in the Kozulla et al. patent referred to above.

A diaphragm assembly 42 is mounted in the coupling half 10 and includes a substantially rigid tubular member 43 having an outside diameter proportioned to closely fit the inner surface of the tubular projection 21 and connected thereto by solder along the interengaging faces at 44. Forwardly of the solder joint the tube 43 is formed with a counterbore 46 which receives the skirt 47 of a cup-shaped diaphragm 48 having a dome-shaped end wall 49.

Figure 3:
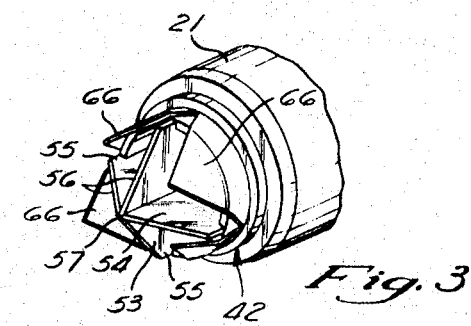

Positioned within the bore 17 is a cutter assembly including a tubular portion 51 which closely fits the bore 17 and seats at its end against the shoulder 18. Mounted in the forward end of the tube 51 is a cross cutter 52 including two cutter blades 53 and 54, each of which extends across the inside of the tube 51, crossing at the center axis thereof. The two cutter blades 53 and 54 are each formed with forwardly extending cutter edges 56 which join at a forward point 57 as best illustrated in FIGURE 3. Each of the cutting edges is inclined backward from the point 57 to a radius equal in diameter to the outside diameter of the tube 51 so that four symmetrically arranged cutting edges are provided which are adapted to pierce and cut back four leaves from the diaphragms. The blades have radil projections 55 which abut the forward end of the cutter tube 51 to support the blades against axial loads.

The other coupling half 11 is closed by a cup-shaped diaphragm 60 having a skirt 61 located in the counterbore 33 and permanently connected thereto by solder or the like. The diaphragm includes an end wall 62 formed with a dome shape substantially matching the dome shape of the end wll 49 in the diaphragm 48, but spaced therefrom as illustrated in FIGURE 1. The inner surface of the skirt 61 is substantially flush with the bore 32.

During assembly of the coupling the two coupling halves 10 and 11 are placed in face-to-face adjacency and the tube nut 44 is rotated to bring the elements to the intermediate position of assembly illustrated in FIGURE 1. At this point in the assembly the forward end of the ring 42 engages the wall 34 to prevent further movement of the diaphragm assembly 42 with the body 12 of the coupling half 10. Also at this point in the assembly the cutter has not as yet contacted either of the diaphragm end walls 49 or 62 and these walls are spaced from each other. The tubular projection 21, however, has engaged the inner surface of the bore 36 to provide a fluid-tight connection between the two bodies.

Continued threading of the tube nut 24 onto the body 27 causes the solder connection at 44 to be sheared. However, leakages does not occur since a fluid-tight joint is already provided by the interengagement between the projection 21 and the wall of the bore 36.

As the body 12 moves toward the body 27, the forward point 57 of the cutter first engages the diaphragm wall 48 and commences the cutting of the diaphragm into four leaves 66 extending out from the center of the diaphragm. Continued assembly then causes the point 57 to engage the diaphragm wall 62 and again cause more leaves 66 to be cut from this diaphragm. By spacing the two diaphragms apart, improved cutting is achieved since the diaphragm 48 is initially cut before the corresponding initial cutting of the diaphragm 60. This reduces the cutting force required and also improves the cutting function of the cutter.

As the two coupling halves continue to move toward each other to the final coupled position of FIGURE 2, the two diaphragm walls 49 and 62 are cut to their axial skirts and then are bent down along the inner surface of the body 27 by the tube 51 of the cutter. Since the tube 51 extends completely around the bore, all four leaves 66 of both diaphragms are bent outward into substantial engagement with the surface of the bore 32. Preferably the two diaphragms 48 and 60 should be formed of relatively thin metal, preferably having a thickness of about ⅓ the thickness of the tube 43. Also the outside radius of the tube 51 should be less than the radius of the bore 32 by an amount equal to about the total thickness of the two diaphragms 40 and 60 so that the leaves 66 are pressed outwardly into substantially tight engagement with the wall of the bore 32.

With this structure the smallest diameter of the passage through the diaphragms is substantially equal to the diameter at the inside of the tube 51. This diameter is preferably substantially equal to the inside diameter of the tube ends 14 and 29. Therefore, substantially the only reduction in the cross section of the passage through the coupling is provided by the two blades 53 and 54 of the cutter. This reduction in cross section is insignificant so substantially unrestricted flow is provided through the assembled coupling half. It should be noted that the tube 51 does not extend completely past the ends of the leaves 61. However, it does extend a sufficient distance to press the ends of the leaves out to a radius about equal to the inside radius of the tube 51.

Since the two diaphragms 48 and 60 are of substantially uniform thickness, they can be formed as simple stampings. The diaphragm 48 can be assembled in the tube 43 by simply positioning its skirt in the counterbore and soldering the joints therebetween. This operation can be performed in production at a very low cost so that the assembled diaphragm having a relatively rigid ring or tube and a relatively thin diaphragm end wall is economical to manufacture.

The positioning of the diaphragm 60 in the body 27 and the soldering of it in position is also an economical production operation. Further the solder joint between the projection 21 and the tube 43 is economically performed. Therefore, the cost of a coupling incorporating this invention is low even though the resulting structure provides reliable operation and a substantially unrestricted low connection.

The cutter structure is arranged to insure that no loose pieces of diaphragm are present in the system. Finally the structure is arranged so that the conical end 67 on the body 27 bottoms out against the wall 22 when the assembly is completed. This provides a permanent seal and also provides a positive indication that the assembly is completed.

Although a preferred embodiment of this invention is illustrated, it is to be understood that various rearrangements and modifications of parts may be resorted to with-

We claim:
1. A coupling comprising first and second coupling members each having an axial bore therein, means to move said coupling members toward each other into a coupled position with their respective bores in axial alignment, a cylindrical surface on said second member, a tubular projection on said first member proportioned to telescope into said cylindrical surface with an interference fit to provide a fluid seal between said coupling members, diaphragm means on said first member including a substantially rigid tube frangibly connected to said tubular projection and proportioned to telescope into said tubular projection after said frangible connection is broken, said diaphragm means also including a diaphragm portion extending cross and closing said rigid tube substantially adjacent to the forward end thereof, and a cutter on said first body member extending into said rigid tube and providing cutting edges substantially adjacent to said diaphragm portion, said second coupling member being provided with a stop surface engageable with said rigid tube to limit movement thereof toward said second coupling member during movement of said coupling members toward said coupled position;

said tubular projection, cylindrical surface, rigid tube and cutter being proportioned so that,
(a) said tubular projection extends into said cylindrical surface and establishes a seal between said coupling members before said rigid tube engages said stop surface and permits telescoping movement to continue until said members reach said coupled position,
(b) engagement of said rigid tube with said stop surface causes said frangible connection to break and causes rigid tube to telescope between said cutter and said tubular projection as said coupling members move to said coupled position, and
(c) movement of said coupling members to said coupled position causes said cutter to shear through said diaphragm portion as said rigid tube telescopes between said tubular projection and said cutter.

2. A coupling as set forth in claim 1 wherein a second diaphragm is provided in said second coupling member to close its axial bore, and movement of said coupling members to said coupled position causes said cutter to shear through said second diaphragm.

3. A coupling as set forth in claim 2 wherein engagement between said rigid tube and said stop surface maintains said diaphragms spaced from each other before they are cut by said cutter.

4. A coupling as set forth in claim 1 wherein said diaphragm is a separate element formed with an axial flange secured to said rigid tube.

5. A coupling as set forth in claim 1 wherein said cutter includes a substantially rigid cutter tube secured at its rearward end to said first coupling member, and a pair of cutter elements projecting from the other end of said cutter tube.

6. A coupling as set forth in claim 5 wherein said cutter elements are substantially perpendicular to each other and cooperate to provide four inclined cutter edges meeting at a central point.

7. A coupling as set forth in claim 6 wherein said cutter elements include stop projections which engage the forward end of said cutter tube.

8. A coupling as set forth in claim 7 wherein said cutter elements cooperate to cut said diaphragm into a plurality of leaves, and said cutter tube extends along said leaves and presses them clear of said bore when said coupling members are in said coupled position.

References Cited

UNITED STATES PATENTS

| 1,933,117 | 10/1933 | Markle | 285—3 |
| 2,933,333 | 4/1960 | Bredtschneider et al. | 285—3 |
| 2,958,545 | 11/1960 | Stelzer | 285—3 |
| 3,201,148 | 8/1965 | Shurtleff | 285—3 |
| 3,202,442 | 8/1965 | Abbey et al. | 285—3 |
| 3,285,627 | 11/1966 | Kozulla et al. | 285—3 |
| 3,391,951 | 7/1968 | Miller | 285—3 |

DAVID J. WILLIAMOWSKY, Primary Examiner

W. L. SHEDD, Assistant Examiner

U.S. Cl. X.R.

285—331